(12) United States Patent
Kerr et al.

(10) Patent No.: US 11,030,992 B2
(45) Date of Patent: Jun. 8, 2021

(54) SYSTEM FOR COMMUNICATION SKILLS TRAINING USING JUXTAPOSITION OF RECORDED TAKES

(71) Applicant: ROLR, Inc., Santa Monica, CA (US)

(72) Inventors: Edward Kerr, Santa Monica, CA (US); Patrick Malloy, Atlanta, GA (US)

(73) Assignee: ROLR, Inc., Santa Monica, CA (US)

( * ) Notice: Subject to any disclaimer, the term of this patent is extended or adjusted under 35 U.S.C. 154(b) by 0 days.

(21) Appl. No.: 16/807,058

(22) Filed: Mar. 2, 2020

(65) Prior Publication Data

US 2020/0202841 A1    Jun. 25, 2020

Related U.S. Application Data

(63) Continuation of application No. 16/102,231, filed on Aug. 13, 2018, now Pat. No. 10,636,413, which is a continuation-in-part of application No. 13/377,814, filed as application No. PCT/US2010/038552 on Jun. 14, 2010, now Pat. No. 10,079,993.

(Continued)

(51) Int. Cl.
*H04N 5/00* (2011.01)
*G10L 13/10* (2013.01)
*G09B 9/00* (2006.01)
*G06N 20/00* (2019.01)
*G09B 19/00* (2006.01)
*G10L 15/26* (2006.01)
*G10L 13/00* (2006.01)

(52) U.S. Cl.
CPC .............. *G10L 13/10* (2013.01); *G06N 20/00* (2019.01); *G09B 9/00* (2013.01); *G09B 19/00* (2013.01); *G10L 13/00* (2013.01); *G10L 15/26* (2013.01); *G10L 2013/105* (2013.01)

(58) Field of Classification Search
CPC .............................. H04N 5/23277; H04N 5/76
USPC ..................................................... 348/722, 61
See application file for complete search history.

(56) References Cited

U.S. PATENT DOCUMENTS 7,058,889 B2    6/2006  Trovato et al.
7,324,166 B1    1/2008  Joslin et al.
(Continued)

FOREIGN PATENT DOCUMENTS

CN    1463419 A    12/2003
CN    101082901 A    12/2007

*Primary Examiner* — Jeffery A Williams
(74) *Attorney, Agent, or Firm* — Stefan J. Kirchanski; Matthew J. Spark; Zuber Lawler LLP

(57) ABSTRACT

An Internet-based application allows a trainee to record a performance of a scene containing roles A and B with performers for the scene's roles alternately speaking their respective lines. The system displays the lines in a teleprompter style, and based on the experience level of the trainee, may blank out increasing portions of the teleprompter-style lines. If the trainee is assigned role A, the system will present each role A line to be spoken by the trainee with a time progress bar indicating the speed/timing or time remaining for that line. The trainee's performance is recorded by a computer. The teleprompter timer ensures that the trainee's performance is coordinated with a take of role B, even though the trainee's take and the role B take are actually recorded at different times. The takes are played in tandem for evaluating effectiveness of the training.

13 Claims, 21 Drawing Sheets

Related U.S. Application Data

(60) Provisional application No. 61/186,841, filed on Jun. 13, 2009.

(56) References Cited

U.S. PATENT DOCUMENTS

| | | |
|---|---|---|
| 7,757,157 B1 | 7/2010 | Fukuda |
| 8,824,861 B2 | 9/2014 | Gentile et al. |
| 10,636,413 B2 * | 4/2020 | Kerr .................. G09B 9/00 |
| 2002/0109710 A1 | 8/2002 | Holtz et al. |
| 2007/0260968 A1 | 11/2007 | Howard et al. |
| 2008/0010601 A1 | 1/2008 | Dachs |
| 2009/0006096 A1 | 1/2009 | Li et al. |
| 2010/0062403 A1 | 3/2010 | Williams et al. |
| 2013/0254129 A1 | 9/2013 | Perlmutter et al. |

* cited by examiner

Submissions

My box is not working
pending review
Maria Chung • Tue, April 3

My box is not working
pending review
Larry Smith • Tue, April 3

Angry customer on the phone
pending review
Maria Chung • Tue, April 3

Discounts and gifts
graded
Maria Chung • Tue, April 3

Helping customers make decisions
graded
Maria Chung • Tue, April 3

FEED   SUBMISSIONS   SCENARIOS   TEAMMATES

FIG. 18

SYSTEM FOR COMMUNICATION SKILLS TRAINING USING JUXTAPOSITION OF RECORDED TAKES

CROSS-REFERENCE TO PRIOR APPLICATIONS

The present application is a continuation of U.S. patent application Ser. No. 16/102,231 (now U.S. Pat. No. 10,636, 413) and claims the priority and benefit of that application, which is a continuation-in-part of U.S. National Phase application Ser. No. 13/377,814 (now U.S. Pat. No. 10,079, 993) and claims the priority and benefit of that application which, in turn, claims priority from PCT/US2010/038552, filed on Jun. 14, 2010 designating the United States, which in turn was based on and claims priority and benefit from U.S. Provisional Patent Application Nos. 61/186,841, filed 13 Jun. 2009, all of which applications are incorporated herein by reference.

U.S. GOVERNMENT SUPPORT

Not applicable.

BACKGROUND OF THE INVENTION

1. Field of the Invention

The present invention describes a process for training and improving communication skills and is more particularly directed to an application for simulating and training responses to personal interactions.

2. Introduction to the Invention

There are many reasons why a person would want or need to improve their communication skills. Some people are interested in learning a new language (i.e., foreign). Still others may seek to refine their ability to promote a corporate message, for example, in responding to customer comments or complaints. Moreover, some people may simply want to improve their ability to converse, either in general or within a specific context. However, there has been a dearth of ways for an interested person to improve their conversational skills.

Traditionally, people interested in improving their conversational skills often take classes/training sessions that rely on a "lesson-quiz" model, wherein an instructor teaches and afterward, a student is tested on the material. There are potential downsides to the "lesson-quiz" model. First, students frequently forget, within a short period of time, a large percentage of what they have learned. Second, such classes often lack the repetitive practice and opportunities for skill refinement that students need to retain and effectively apply lessons long-term; indeed, for many social interactions, employees and/or students should practice exhaustively such that their responses to specific scenarios incorporate and conform with "best practices" as a matter of second nature. Third, the classes are almost invariably expensive, especially if a continuous and/or regular training regime is implemented. Fourth, even if such classes include an interactive component wherein students practice their conversational skills, these classes often necessitate some form of live, if not in-person (as opposed to asynchronous and remote) interaction. This necessity inhibits the ability of students to flexibly learn on their own schedules—particularly when the student needs to review previously taught lessons. Indeed, the problems arising from this lack of flexibility are exacerbated if a continuous and/or regular training regime is implemented. Fifth, the curricula of these classes are often difficult to update and/or otherwise modify, and therefore frequently contain content that cannot be readily tailored to a student's needs.

However, technological developments now enable people to move beyond the "lesson-quiz" model. In lieu of live, in-person interactions, a person seeking to improve their conversational skills can practice interacting with (i.e., speaking with) recordings, either audio and/or audiovisual, that were made asynchronously in relation to the person's practice session and remotely in relation to the person's practice location. Today, recordings, either audio and/or audiovisual, can be readily produced and distributed. A voice recorder and/or a video camera may be easily attached to (or be part of) a computer for recording audio and/or audiovisual files; modern "smart" phones are equipped with cameras and microphones and are ideal for communication training. Audio and/or audiovisual files can in turn be readily uploaded to an Internet-connected server, so that the files may be remotely accessed, played, and interacted with. A person's practice sessions can be guided by a written script of a dialogue; i.e., the person's lines, along with the lines of the recording he or she is interacting with, follow a written script. Today, word processing and Internet technologies enable scripts to be quickly and remotely created, uploaded, and modified, so as to tailor a person's practice session to any need. For example, whereas beginners might practice their communication skills with basic scripts that reflect simple scenarios, persons who are more advanced might practice with more complicated scripts that pertain to more difficult scenarios. Moreover, word processing and display technologies enable varying portions of the script to be displayed to a person practicing his or her communication skills, such that more experienced persons may see less of a script than others would see.

SUMMARY OF THE INVENTION

The instant invention enables a user to perform a first role from a scripted scenario and record his or her performance while listening to and/or watching a take of a second role from the scenario's script. For purposes of the instant invention, a "take" is either an audio-only or audiovisual recording of a performance of a role from the scenario's script. Because the user is listening to and/or watching a take of the second role while performing the first role, the user experiences a simulation of interacting and conversing with a person. The user is able to experience a convincing simulation even though the take of the second role was made at a different time and place (i.e., asynchronously and remotely) in relation to the user's performance.

In the instant invention, the takes of different roles within a scenario may be combined with one another, so as to form a "scene," wherein the scene's constituent takes appear to have been recorded at the same time even though these takes have been recorded asynchronously and remotely. Put differently, when takes are combined to form a scene, the scene, when played, gives a viewer the impression that the performers of the constituent takes were engaged in conversation, even though one performer recorded his or her take long after, and in a place distant from where, the other recorded his or her take. A combination of two takes from a scenario creates a scene—that is, a scene is an instantiation of a scenario. Combining (or "juxtaposing") takes enables persons to review and evaluate a given user's performance by experiencing the overall scene; after all, it is difficult to evaluate how effective a person's communication skills are unless the evaluator is able to hear the words of whomever the person purports to speak with. For purposes of the instant invention, a "scene" may be formed from takes that are either audio-only or audiovisual; indeed, an audio-only take of one role may be combined with an audiovisual take of another role to form a scene. By making all the performances juxtaposable, one reviewer can evaluate a large number of trainee performances all against, for example, the same customer, so that everyone is evaluated identically.

One embodiment of the invention is used for employee training. The company trainer establishes the curriculum in the form of scenarios that lay out particular interactions with customers. The trainer instructs the trainee what to say and how to say it by providing the scripts for, e.g., a customer complaint and the proper way the trainee should respond. For many scenarios, there is a best practice that trainees should apply for dealing with, e.g., a specific variety of customer complaint; consequently, these scripts can reflect such best practices and trainees can, through practicing these scripts, make these practices "second nature" to them. In this embodiment, the trainer may create and input scripts for new scenarios, to enable others to create takes and scenes. Illustratively, corporate trainers may readily create, upload, update, and otherwise modify scripts pertaining to specific scenarios that employees are being trained to handle. For example, different scripts can pertain to different types of customer service scenarios, and can enable employees to practice the different types of conversations that are required by these varying issues. The table below shows a number of possible subjects for scenarios.

TABLE 1

Script/Scene Categories

1. Interacting with angry customers
2. Greeting customers in the store
3. Talking to customers who believe a competitor's product is better
4. Convincing customers one's products are better than the competition's
5. Giving discounts to customers
6. Holiday specials for customers
7. Generating sales leads that develop into new customers
8. Attracting potential customers and giving special deals By using a simple personal computer (or similar computing device, e.g., a game console, smartphone or tablet computer) to make audio-only and/or audiovisual takes that can be uploaded to an Internet site, a huge worldwide audience (e.g., the employees of a large multi-national corporation) is within reach. Illustratively, a corporate trainer can view different takes of a customer service representative role, and combine each of them with a take of the same customer role, to evaluate the effectiveness of different representatives in dealing with the same customer. Junior customer service representatives seeking to improve their communication skills may view the take of a senior representative interacting with a take of a particularly difficult customer and seek to mimic and/or improve upon that senior representative's take by interacting with the same take of the difficult customer and recording his or her own take. This junior representative's take can then be combined with the customer take to make a new scene; this new scene can in turn be evaluated by the senior representative so that the senior can give feedback to the junior. A corporate trainer may view a scripted scene pertaining to customer service, and based upon a recent real life experience; modify the script to train employees to handle a slightly different scenario. It is further appreciated that employees may submit their own scripts to share their own lessons from recent customer service experiences, such that job training can be a "top-down" as much as a "bottom-up" process.

The trainee uses the inventive system for intensive and repeated practice. Through practice and repetition, the trainee learns to anticipate and authoritatively overcome complaints and arguments, and do so in a way that is almost second nature to them. Once the trainees have acquired command of the material, they can focus on communicating with empathy, authenticity, and personality. In a nutshell, the training embodiment of the invention involves four steps: (1) a trainer creates practice scenarios (simple questions and answers, or more preferably, a more realistically simulated conversation between a customer and a company representative); (2) a trainee practices the scenario using a script a required number of times while recording an audio or video of the performance; (3) the trainee submits a single recording made without reference to a script (although the trainee may be allowed to use keywords or talking points); and (4) the trainer evaluates the submitted recording and determines whether the trainee has either mastered the material or needs additional practice (the trainer may also provide feedback to facilitate mastery of the material).

In one embodiment, an Internet-based application allows a trainee to sign in to a website to record a performance, thus creating a take. For example, think of a scene between persons A and B, with the persons alternately speaking their respective lines for roles A and B, respectively. If the scene represents a common customer service scenario that a corporate trainer wants to focus on, there can be an Internet link to an audio or audiovisual clip of the original scene so that trainees can play it. The system delivers the lines to be performed in a teleprompter format. The trainee is assigned to perform role A (e.g., the role of a customer service representative), and the system presents each line to be spoken by the trainee with a time progress bar indicating the duration, speed, and/or timing for that line. Preferably, a take of role B is played so that the user can interact with someone speaking the lines of role B (e.g., the part of an aggrieved customer). The take is recorded with a smartphone or by the user's computer using a microphone and/or video camera that may be either built-in (e.g., as in a Macintosh computer & most laptops) or separately connected to the computer. The trainee is able to play back his or her take and rerecord it as desired. When the user is satisfied, the take is uploaded to the website. After the take is uploaded, a trainer and/or even the user's peers can access the user's take to evaluate and/or learn from it. For purposes of the instant invention, a "take" is either an audio-only or audiovisual recording of a performance of a role.

Defined time frames govern the duration (for a performance) of each line of each role of any given script. A timing indicator (such as a progress bar that increases in length or a change in color or font of the script words) displays for the user on his or her local computing device the duration of each line of the script as it is being performed or played, so as to ensure that the user's performance of a role will always be in sync with any takes (prerecorded or subsequent) of any other roles within the script. The progress bar is provided as a graphical indication of the time remaining for a given line of the scene. For example, if a scripted line is 31 seconds in duration, the full bar would represent 31 seconds. As time passes, the colored (or patterned) portion of the bar increases linearly until the entire bar is filled. This allows the user to pace the delivery of a line. The progress bar is primarily for the benefit of the user recording a take; however, a progress bar can also be presented for lines in the previously recorded take (or master) against which the current take is being recorded. This helps the user get ready for the beginning of the next line to be recorded. Where different progress bars are presented for each role's respective lines (e.g., one bar for Actor A and one for Actor B), the bars can have different colors or patterns to distinguish the progress bars. Alternatively, the A and B bars can have different labels and/or appear in different locations. An additional feature can be a Total Progress bar that expresses the entire scene as a series of spoken lines. In a scenario made up of five separate lines, the Total Progress bar would be divided into five segments with the length of each segment scaled to the amount of time allotted to each line. As each line is performed, the segment of the progress bar corresponding to that line behaves in the same manner as the primary progress bar. The Total Progress bar makes it very easy to see exactly where the current action is located within the scene as a whole. These defined time frames allow any user's take to be combinable with any take of another role in the script, such that, for example, performances of role A's and B's respective lines, when played, do not overlap in contravention of the script, so as to create a scene wherein the user's role A performance is seemingly performed together with role B's recorded performance. Thus, defined time frames governing duration, as imposed by means of a timing indicator that is displayed as each line is presented teleprompter style, enables the creation of juxtaposable audio and/or audiovisual takes that were originally recorded asynchronously and/or remotely from one another.

In certain embodiments, when a user is recording his or her take of role A, the system, in communication with a personal computing device, and in synchrony with the user's performance of the script and with the playing of a take of role B, performs the following actions. First, when the user has a speaking part, the system, in synchrony with the user's speech: (1) displays the appropriate line, teleprompter style, that the user is performing at the moment along with the duration information (i.e., a progress bar) for said line and (2) plays, for the user to act against, a prerecorded take of actor B showing actor B's audio and/or audiovisual reactions to the line. Second, when actor B has a speaking part, the system, in synchrony with the playing of actor B's prerecorded take, (1) plays for the user his or her contemporaneous audio-only and/or audiovisual reaction to actor B's speech and (2) may also display the appropriate line, teleprompter style, that actor B is performing at the moment along with the duration of said line. The take of role B may be either prerecorded and/or a computer-generated synthetic voice (text-to-voice) reading of role B's lines. Moreover, persons skilled in the art would appreciate that the text of any lines that are displayed teleprompter style (e.g., role B's lines) can be computer-generated through voice-to-text recognition.

To further avoid confusion in the recording, i.e., to further avoid the user "speaking over" actor B's take in contravention of the script, the user's local microphone may be automatically muted whenever only actor B has a speaking line. Moreover, in certain embodiments, the system allows the recording components to be engaged so as to continuously visually record one person interacting with a recording while muting the microphone when the person does not have a speaking line.

In many cases, the system will already contain multiple prerecorded takes of a scenario's roles A and B. The user can decide to perform against any of the available takes. In that case, the chosen recording against which the user will perform will be played and will "speak" its lines in alternation with the user performing the other role. Because of the way each line of each role is timed, takes of roles A and B can be randomly chosen and combined (juxtaposed) such that a coherent scene will always result, wherein the A and B takes will not speak over one another in contravention of the script. (Note: if there are only two roles to combine, a juxtaposition may also be referred to as a "pairing"). This juxtaposition capability can be also used for evaluating rehearsals and auditions (e.g., for a movie or theater role), for evaluating an interviewee for a job (e.g., for a customer service position), for evaluating a current employee's communication skills, for evaluating a person's foreign language skills, as well as for social interactions.

In certain embodiments, when the system is used to create and input new scripts for scenarios, the trainer (or an administrator) inputs the script, broken into lines, into the system. Then, individual(s) (or text-to-voice software) perform the script, so as to record all of the script's lines and create an audio-only or audiovisual "master" take of each role of the script. Each role's master take establishes the time frames (duration) for the performance of each line of the role for all subsequent performers. Collectively, the timing information generated from these master takes, which governs the durations of the performances (and resulting recordings) of each line of each role of the script is referred to as the script's "embedded timing information."

All takes that share the same embedded timing information, whether audio-only or audiovisual, are interchangeable with one another (if they pertain to the same role) and juxtaposable with one another (if they pertain to different roles). Illustratively, assume that a scenario is comprised of takes from roles A and B. Assume further that all takes of roles A and B share the same embedded timing information, generated from the "master" takes of roles A and B, which were the first takes of said roles created. The scenario's constituent role A take can be switched out (interchanged) with any other take of role A without modifying any of the following: (1) either role A take or (2) the scenario's constituent role B take. Moreover, without modifying any of the aforesaid, the newly interchanged take would also be juxtaposable with the scenario's constituent role B take, or with any other subsequent take of role B.

Preferably, the embedded timing information is automatically derived from the audio of master takes. For example, if a performer of a master take stops speaking, the system automatically detects the silence, so as to determine the duration of the line the performer just spoke. Alternatively, a creator of a new script may record individuals performing roles of the script and have the computer detect from the recorded audio both the duration of each line of each role of the scene and/or the actual written language of each line of each role through voice-to-text recognition software, so that a written script can be automatically generated. That is, a written script can be generated via voice-to-text recognition software from an actual recorded customer service interaction.

After the embedded timing information is established from the master takes, subsequent users who follow the script can then create new audio-only and/or audiovisual takes, wherein the durations of each line of these takes is governed by the embedded timing information ascertained from the script's master takes. Moreover, because the timing information (i.e., the duration of each line) for any given role is the same for any take of that role, the new takes can subsequently be used as "master" takes in their own right.

Furthermore, any takes of a role within the scenario can be combined (juxtaposed) with any other take of another role of the same written script, as long as the juxtaposed takes are governed by the same embedded timing information. When juxtaposition occurs, a scene will be created, wherein the scene will appear as if both takes were recorded at the same time. Put differently, the embedded timing information ensures that different takes will not "speak over" one another in contravention of the script, such that the different takes are juxtaposable.

While the system may be described in terms of actors performing roles, there are actually many other important uses for the inventive system. The system is particularly useful in job training and HR (human resources) where the goal is to teach an individual to respond to certain situations (through, e.g., best practices) or where it is desired to monitor an employee's or potential employee's responses to a given situation.

Illustratively, imagine training a help-center employee to respond to, troubleshoot, and solve a variety of customer problems. In the training mode, the two parts, A and B, would be the help center employee (A) versus the customer (B). The employee (A) would read and perform the employee role. The customer (B) would present real-world problems and would respond realistically to the employee in training. This process can be accompanied by other training exercises in which specific technical problems are explored, such that the employee would be taught how to identify and solve these problems. The A-B role-playing would give the employee realistic practice in responding to a customer. In addition, so that the employee learns to appreciate the customer's view, both the A role and the B role can be performed by employees in training.

The system enables a trainer (or even fellow employees) to modify a training script, and record new takes to form new scenarios, to train employees on variations of a common problem, or even to train employees on completely different issues. Illustratively, a trainer in the field may encounter a variation of an already scripted customer service scenario, and update, through his or her mobile smartphone, the system's script, and record take(s) based on this script.

In certain embodiments, the system tailors the training experience to how advanced a trainee is. For example, as the training progresses, the B role can become more and more variable so that the employee learns to deal with a range of scenarios. Alternatively, the teleprompter script for the employee lines can switch from a mode wherein the full script is provided, to a mode wherein only key words or phrases (e.g., essential talking points) are provided, and finally to a mode wherein there is no written script at all. Put differently, as the training progresses, progressively increasing portions of, e.g., the A role teleprompter script, can be blanked out so that the employee learns to respond in an increasingly spontaneous manner. As an employee practices, he or she may need progressively less guidance from a teleprompter script because he or she is better able to recall the script from memory and/or is better able to improvise a response that maintains fidelity to the "best practices" or lessons the script is trying to impart. The ultimate goal is for the trainee to respond effectively and spontaneously to a live customer complaint.

As training progresses, increased difficulty can be achieved by using a "chatbot" system. In such an embodiment, the "customer" response can be automatically tailored to the trainee's non-scripted remarks where the trainee script is partially blanked out to teach spontaneity. A chatbot system uses artificial intelligence and pattern matching to give a seemingly spontaneous response. Whereas in the earlier examples, the trainee knows exactly what the customer will say, with a chatbot system, the exact wording of the customer response will vary depending on the words used by the trainee to respond to the immediately previous customer statement. Although these responses are apparently spontaneous, the system can be set so that the "customer" responses are elicited to demonstrate certain skills on the part of the trainee. The "customer" can become confused and ask certain (perhaps unexpected) questions. The trainee will then respond and the subsequent "customer" statement is seemingly in response. When the interchange between the trainee and the "customer" is particularly apropos to the training mission at hand, the recording can form the basis of a new script for other trainees to perform. Thus, besides the new training scripts introduced by the trainers, the system can also evolve and create new training scripts.

The inventive system is also ideal in language training, both to learn vocabulary and pronunciation and to improve comprehension and response. The technique of progressively blanking out more and more lines in a teleprompter script can also be used slowly to train individuals to speak a new language. For example, a beginning student may be given a full script to practice a basic conversational scenario in a foreign language. However, as the student learns more and more of the foreign language, more and more of the script can be blanked out to enable the student to rely increasingly on his or her memory to converse. When used as a foreign language training tool, a "language switch" button can be provided. For example, a user may respond in Spanish to a take recorded in Spanish. However, activating the "language switch" causes the opposite role to be presented in English so that the user learns how to respond in Spanish to a take in English.

Moreover, the invention can be used as an examination tool to gauge how well an employee, foreign language student, or any other type of trainee has learned. Because any take made by a user, such as a student or trainee, is governed by the script's embedded timing information, any user take is readily combinable (juxtaposable) with the prerecorded take with which the user was "speaking," so as to form a scene. This ability readily to form scenes with user takes enables a teacher or trainer uniformly and therefore fairly to evaluate the quality of all users' conversational skills against the same prerecorded take.

Moreover, the fact that all user takes are being compared against the same prerecorded take facilitates automated analysis (e.g., via artificial intelligence) of user takes. A teacher or trainer may have many (e.g., hundreds if not thousands) of students or trainees. Thus, a teacher or trainer may not have the ability to efficiently watch and review every portion of every user take. Consequently, it may be desirable for the system to automatically evaluate various aspects of a user's performance, such as (1) fidelity to the script (e.g., fidelity to a best practice of addressing a particular scenario); (2) eye movement (e.g., whether one is looking at the camera in a trustworthy manner); (3) tone of voice; (4) facial expressions; (5) other features that indicate mood, trustworthiness, likeability, etc.; and (6) user response times (e.g., how long it takes for the user to recall and express the best practice response for any given line), which may also be indicative of users' respective skill levels. The system could then assign a "score" to the user's take for each of these previously mentioned criteria. A teacher or trainer could then quickly review these scores to develop inter alia customized lesson plans for each user. This scoring method may in turn act as both a "carrot" and a "stick" for the user—e.g., users would be motivated to perform well by a desire to avoid low scores as well as by a desire to share their high scores and accomplishments (via, e.g., some form of social media) with their teachers, trainers, and/or peers.

Moreover, artificial intelligence ("AI") may be able to identify and assess the character traits of students or trainees and classify these users as having particular persona (e.g., as friendly, persistent, confident, etc.). Illustratively, a trainee could be instructed in advance (like an actor being given direction) to answer certain questions consistent with a given persona and the AI would be able to assess and confirm whether the trainee's response within his or her take was consistent (or inconsistent) with the suggested or required persona and score that response with inter alia the user's: (1) "percentage to persona" match score; and (2) "percentage to verbatim accuracy" in relation to the original scripted "best practice" response. Moreover, AI can also identify key words or phrases that were left out in the user's take.

The aforesaid AI assessments could be rendered quickly and provide relatively instantaneous and iterative feedback to the user. For example, an AI assessment could be communicated to the user and prompt him or her to record another practice take. Illustratively, the trainee could be prompted to re-record right away with messaging saying "Great job! Your eye contact was consistent, you captured the right persona, but you forgot to mention [insert key word], which has affected your overall score. Please try again and don't forget to say [insert key word]." Relatively instantaneous, automated, and iterative feedback can encourage increased repetitive practice by the user and ensure his or her performance's fidelity to the script via what is essentially an automated instruction. This automated iterative feedback system can be used to, e.g., fine tune the user's performance prior to his or her final submission of a video test for an actual teacher or trainer to review. In sum, an automated iterative AI feedback system may eliminate the need for a teacher or trainer to watch and critique potentially hundreds of video submissions.

An automated iterative AI feedback system is able to perform its assessments and didactic purpose more efficaciously when the duration of each line of any given script is standardized. This duration standardization allows for a user's repeat performances of any given line to be successively analyzed quickly, and thus promotes the repetitive practice required to ingrain "best practice" responses for any given scenario within the user. In addition, if an actual human user is replaced with an AI computer (e.g., an automated customer service AI system), the automated iterative AI feedback system is capable of training one AI system to speak with another conversant (e.g., a take portraying a "customer," wherein the take is generated by either an actual human or another AI system).

The training use of the inventive system is not limited to the help-center situation. All types of corporate trainings are amenable to this approach including, for example, sales and other contexts that require customer or potential customer interaction, as well as virtually any scenario that would require communication skills (e.g., conflict resolution, emergency response, etc.). Further, the results of spontaneous responses (for example, where little or no teleprompter script is available) can be used by HR as an "automatic" interviewer, the results of which can be used to judge job candidates in a reproducible and non-prejudiced manner. This eliminates the potential bias caused by using different interviewers or by changes in an interviewer's mood from one interview to the next. Furthermore, a record of the "interview" is preserved in case there are ever questions as to whether the interview was, in fact, fair and without prejudice.

The system is also ideal in the entertainment industry for solving the problems of casting and eliminates potential bias in the casting process as well. Prospective actors can submit A-B scenes wherein all the candidates perform and record their role A take against the same role B take. The casting director is then able to rapidly review (either by himself or via AI) a large number of candidates and quickly select a small group of finalists for the final audition. In addition, the casting director can retain the recording should the need arise to review it.

BRIEF DESCRIPTION OF THE DRAWINGS

FIG. 6A shows the full script; FIG. 6B shows an abbreviated script; and FIG. 6C shows a "no script" situation;

FIG. 8A indicates that the process will start in 3 seconds; FIG. 8B indicates a start in 2 seconds; and FIG. 8C shows an imminent start in 1 second;

FIG. 18 is a depiction of the "Trainees" screen used by the trainer;

DETAILED DESCRIPTION OF THE INVENTION

Figure 1:
FIG. 1 shows a drawing of an "Introductory" screen for the system.

The overall process can be understood by reference to a typical implementation of this system. Those of ordinary skill in the art will appreciate that the system can be implemented in a number of different ways so that the precise appearance may differ from the examples presented here. The preferred embodiment relies on smartphones because these computing devices are extremely powerful as well as ubiquitous. However, a "desktop" version operating through a web browser is also available. This detailed description presents a corporate training embodiment of the invention, but as already touched upon, relatively small changes to the system allow it to be used for language learning, auditions or other similar tasks. In the training context, the user may be either a Trainer or a Trainee, and the system presents slightly different screens to each class of user.

The first time a user accesses the system, the user is asked to set up an account. Thereafter, the user enters the system by identifying himself or herself to the system. The most typical way of doing this is to input a username and a password. The goals are to maintain security, preserve the user's privacy, and/or uniquely identify and track the user's activities in the inventive system. A number of other security and/or identification methods, such as input of biometric data (e.g., fingerprint, retinal scan, and/or facial recognition), can be used in lieu of, or as an enhancement to, the typical username/password system.

The main part of the system (particularly the plurality of recorded takes) normally resides on remote computers, for example in one or more databases. These remote computers or servers are connected (through either wireless or wired implementations) to the user's computer by a network such as the Internet. The user's computer includes any type of networkable computing device, including smartphones, smart watches, touch pads, and game playing stations (consoles) as well as traditional desktop and laptop computers. All that is required of the computing device is the ability to access and play audio or audiovisual data from the network and to accept audio or audiovisual data from a local imaging device and transmit that data to the network.

The application either can reside on an independent web site (with a unique URL) or can be presented through any other web site, e.g., a popular social networking site such as "Facebook." For a smartphone, a dedicated "app" is usually provided; most of the drawings represent the screens from such an app. One embodiment of the present system operates within a web browser, which displays the user interface and connects the user to the remote system or server. In this implementation, much of the functionality is provided by web pages constructed from any of a number of hypertext languages, such as HTML or XML. Additional functionality can be provided through browser plug-ins, such as an Adobe® Flash® Player, applications, and applets written in meta-languages, such as Java and Action Script.

Figure 2:
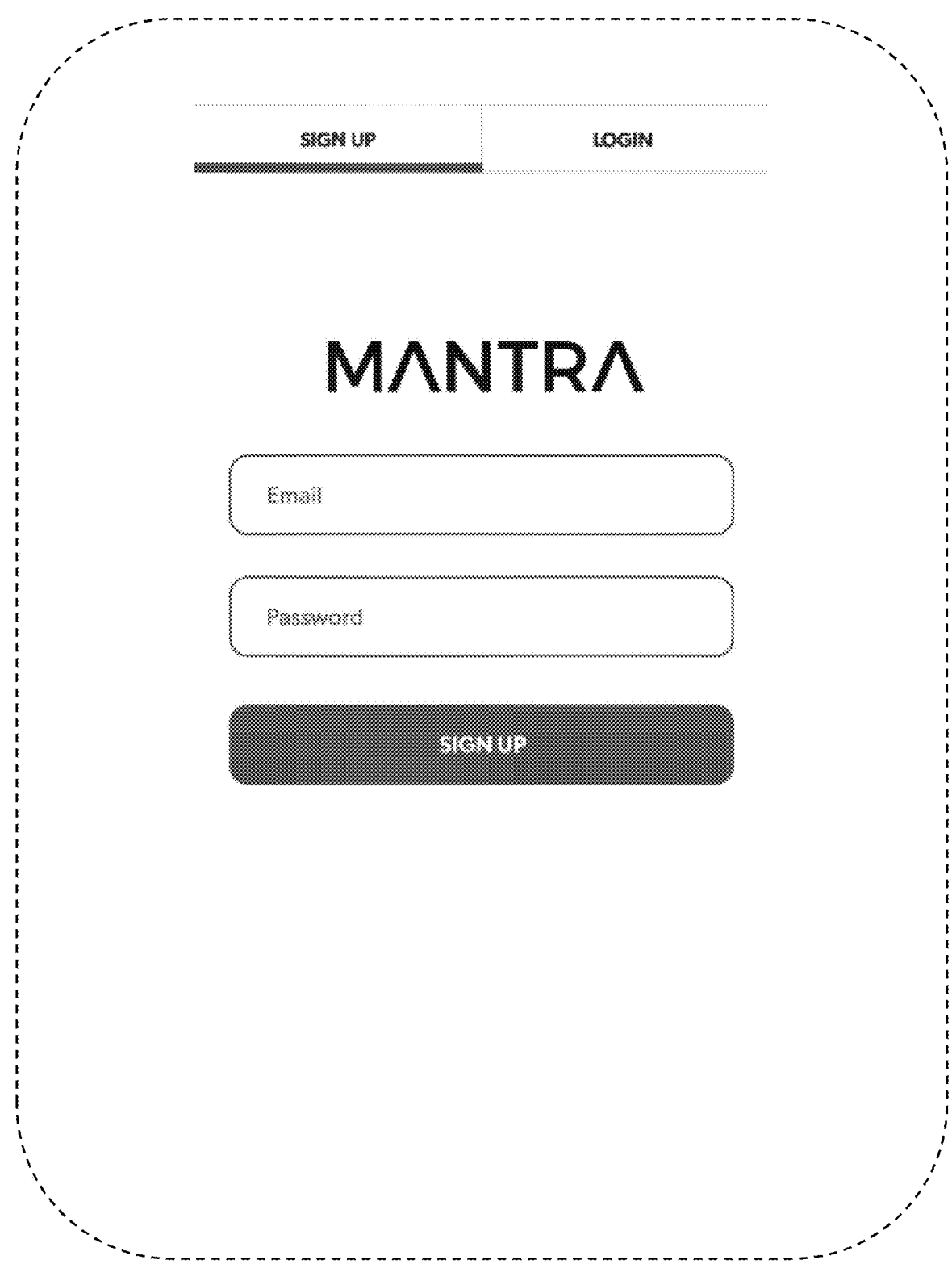
FIG. 2 shows a drawing of the "Sign In" screen.
Figure 3:
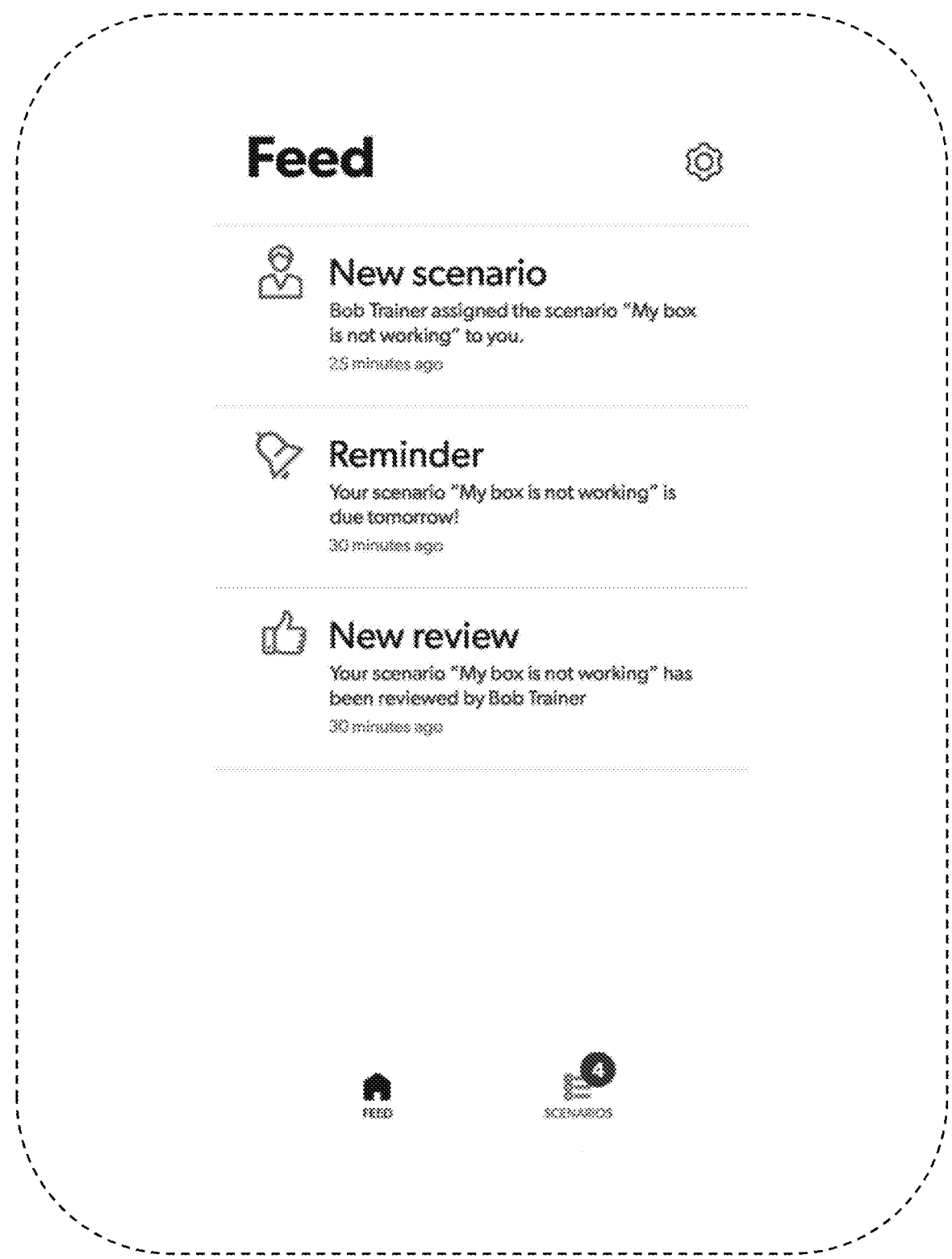
FIG. 3 shows a drawing of the account status "Feed" screen.
Figure 4A:
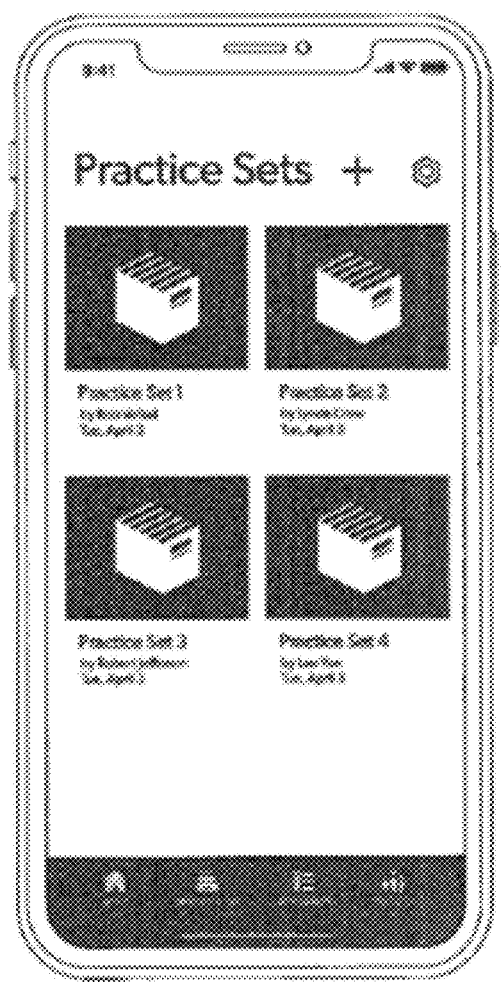
FIG. 4A shows a drawing of the "Practice Sets" screen.
Figure 4B:
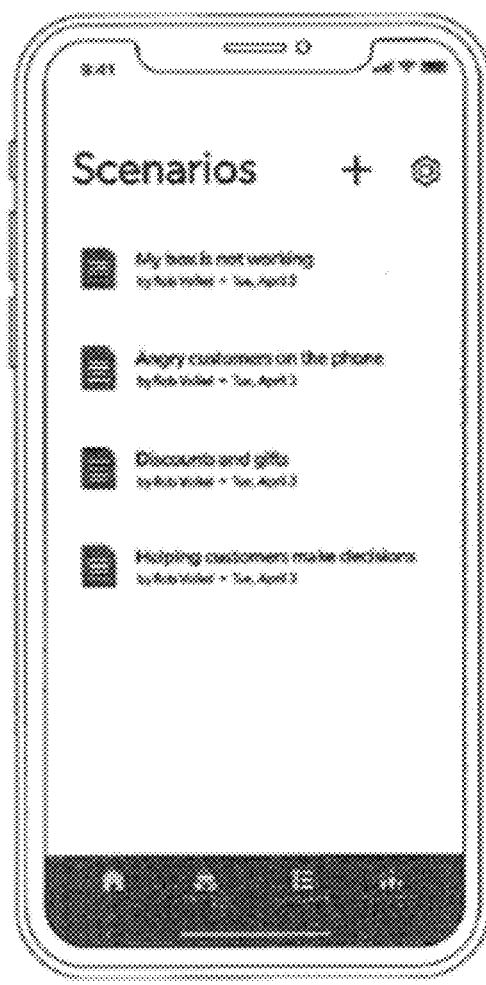
FIG. 4B shows a drawing of the "Scenarios" screen.

Scenarios. As already explained, activity within the system revolves around recording takes that are individual (i.e., constituent) parts of a scene, i.e., an instantiation of a scenario. Most scenarios consist of two participants, although it is possible to construct a system where there are three or more participants in a scenario. It will be appreciated that there is a practical limit because as more participants are added, a scenario may become more confused. It is instructive to walk through the screens experienced by a typical trainee user. FIG. 1 represents an introductory screen displayed each time the app is opened. FIG. 2 shows a typical sign in screen where the user enters a username (usually an email address) and a password. The password may consist of biometric data, such as a fingerprint or face scan usually provided by the computing device (e.g., a mobile telephone). A "Sign Up" button allows a first time user to establish a username and password. When sign in has been accomplished, the user views a general purpose home screen (FIG. 3) herein labeled as "Feed." The home screen shows any new scenarios that have been assigned to the user. Selecting "New scenario" takes the user directly to that scenario. Selecting the "Reminder" link shows upcoming items, and a "New review" link indicates that a trainer has reviewed and graded a previously submitted take of an assigned scenario. A "SCENARIOS" button (lower right) shows the number of scenarios currently assigned to the user; selecting that button takes the user to a listing of all the assigned scenarios on the "Scenarios" screen, which is shown in FIG. 4B. FIG. 4A shows Practice Sets, which are sets of related scenarios. For example, that a company can structure a curriculum that can be continuously reassigned to new hires or to personnel who are advancing in the company. As employees advance, they can be assigned the next phase in course work. Scenarios can also be grouped into Practice Sets by theme—for example, if a trainer wants the trainee to focus on the First Call with a Customer—this can be setup as a Practice Set and include multiple scenarios (either simple single answers to common questions or typical conversational scenarios that a trainee would likely encounter with a customer in that first call). Once a trainee satisfactorily completes the First Call with a Customer Practice Set, the trainee is then prepared to make that "first call" after having rehearsed multiple scenarios related to that kind of customer interaction. Practice sets allow a trainer to dispense structured course conveniently and consistently as opposed to having to assign a bunch of individual scenarios. This allows the trainers to handle the entire curriculum in one easily assignable format.

So rather than having to assign a bunch of individual scenarios, the trainer can dole out structured course work conveniently and consistently. This allows them to house their entire curriculum in one easily useful and assignable format.

Figure 5:
FIG. 5 shows a drawing of the "Practice" screen for a specific scenario.
Figure 6A:
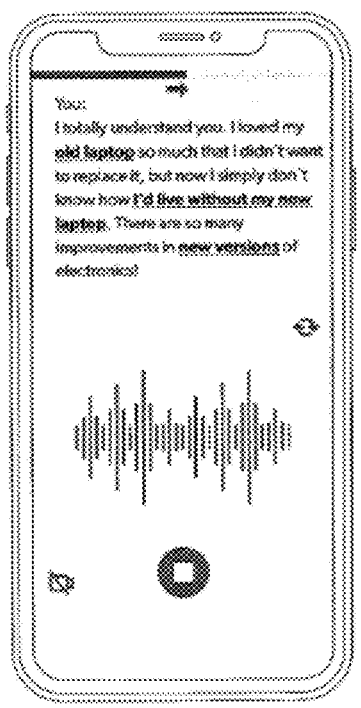
FIGS. 6A to 6C show a screen depicting various script modes.
Figure 6B:
Figure 6C:
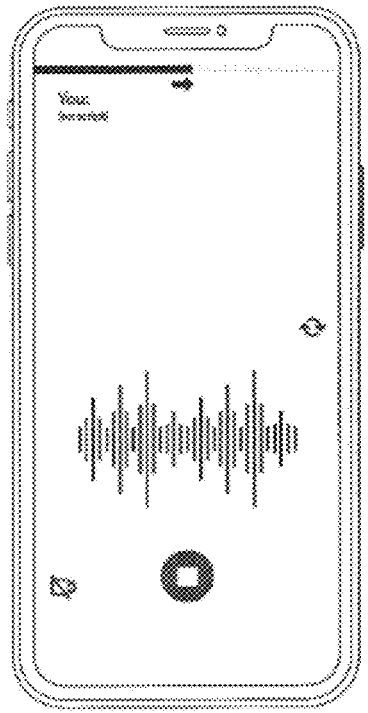

FIG. 5 shows the Practice screen for a particular scenario ("My box is not working") that had been previously assigned to the trainee user. This screen can be reached by selecting either the "New scenario" lead or the "SCENARIOS" button and selecting from the resulting scenario list this particular scenario. The due date for the scenario and whether or not a take of the scenario has been submitted by the user is shown. At the bottom of the screen, a scrollable window provides a description of the scenario. Two Practice buttons are also provided. The first button allows the user to practice with a script; the second button allows unscripted practice. As explained above, the system may be configured to gradually blank out portions of the script as an aid to improving memory and improvisation skills. This can happen successively so that each practice take is guided by an increasingly less complete script. Ultimately, the user is presented with just "talking points" or with no script whatsoever. Buttons leading directly to limited scripts can be provided but are not illustrated here. FIG. 6, shows the full script (FIG. 6A), an abbreviated outline (talking points) script (FIG. 6B), and finally a screen for an unscripted performance (FIG. 6C).

Figure 7:
FIG. 7 is a depiction of the "Get Ready" screen.

When the trainee is ready to rehearse the full script, FIG. 7 shows a "Get ready" screen that is accessed by selecting one of the practice buttons. This particular screen displays a waveform to indicate that the master take with which the trainee will interact is audio only. Note that the camera icon is marked with a slash to further indicate that there is no video in the master take. If a video of the master take is available, the first frame of the video will be displayed in place of the waveform, and the camera will be shown without a slash. In that instance, it would be possible to disable the camera by clicking on it, thereby invoking the slash and causing the first frame to be replaced with a waveform. At the bottom of the screen, a "START" button initiates the recording/performance process.

Figure 8A:
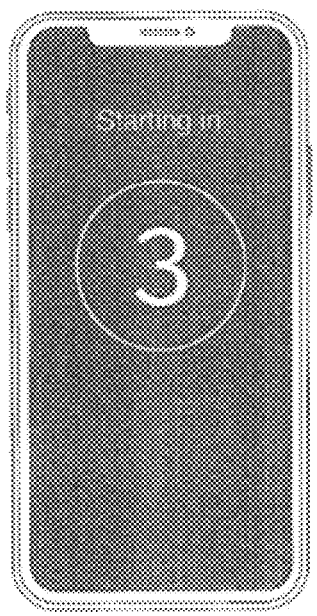
FIG. 8A to 8C show depictions of the "Starting in . . . " countdown screen.
Figure 8B:
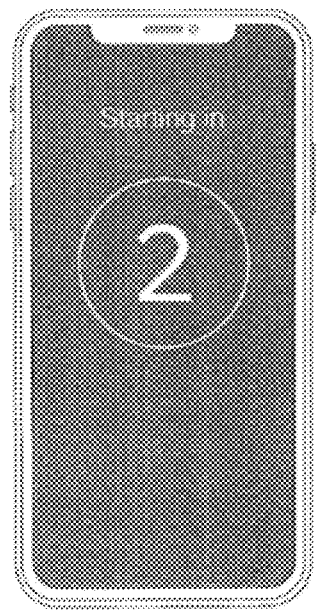
Figure 8C:
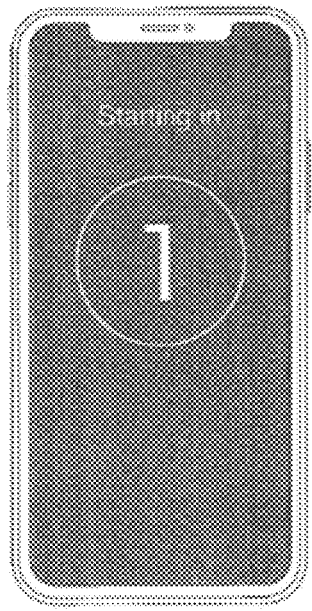
Figure 9:
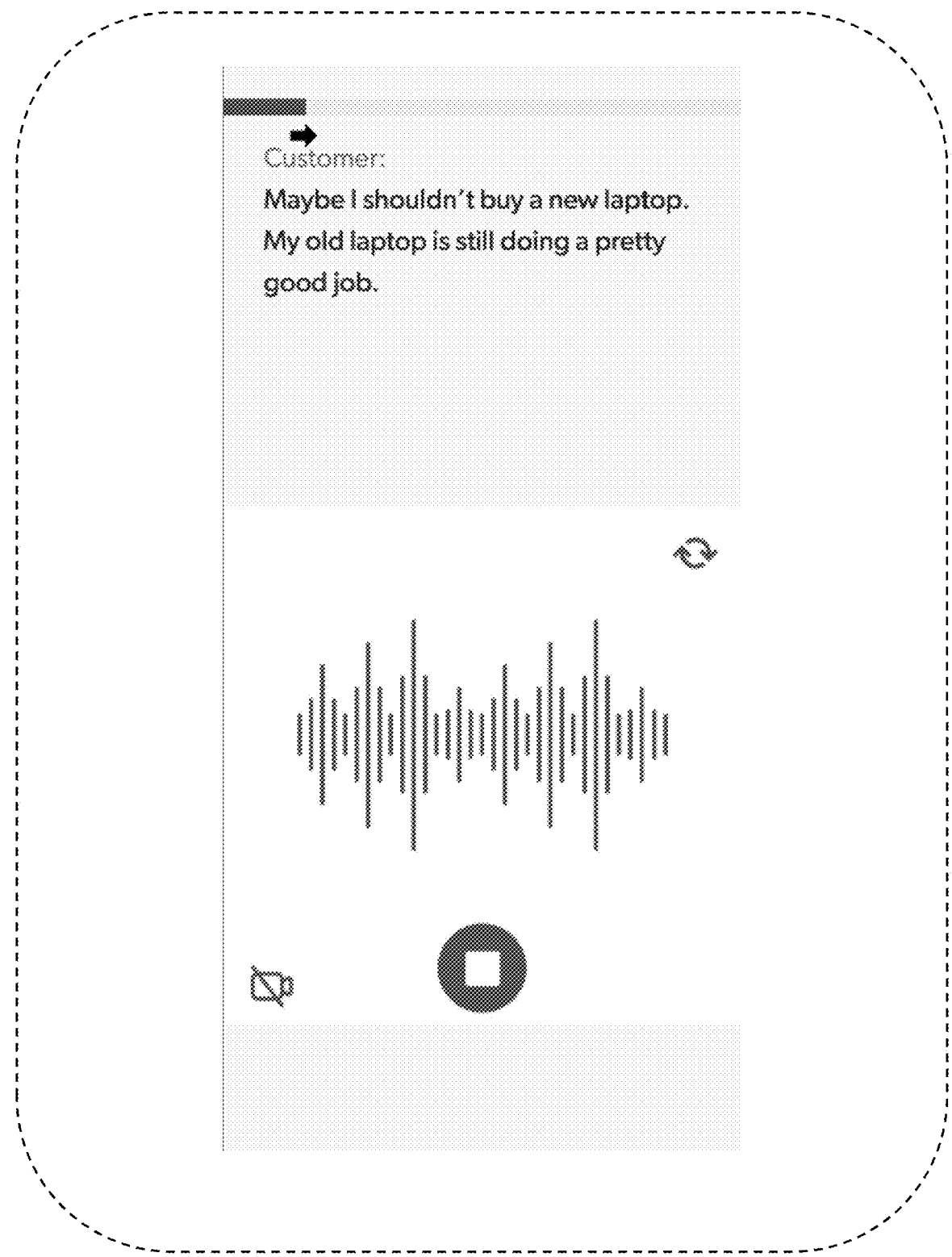
FIG. 9 is a depiction of the "Record" (customer line heard) screen.
Figure 10:
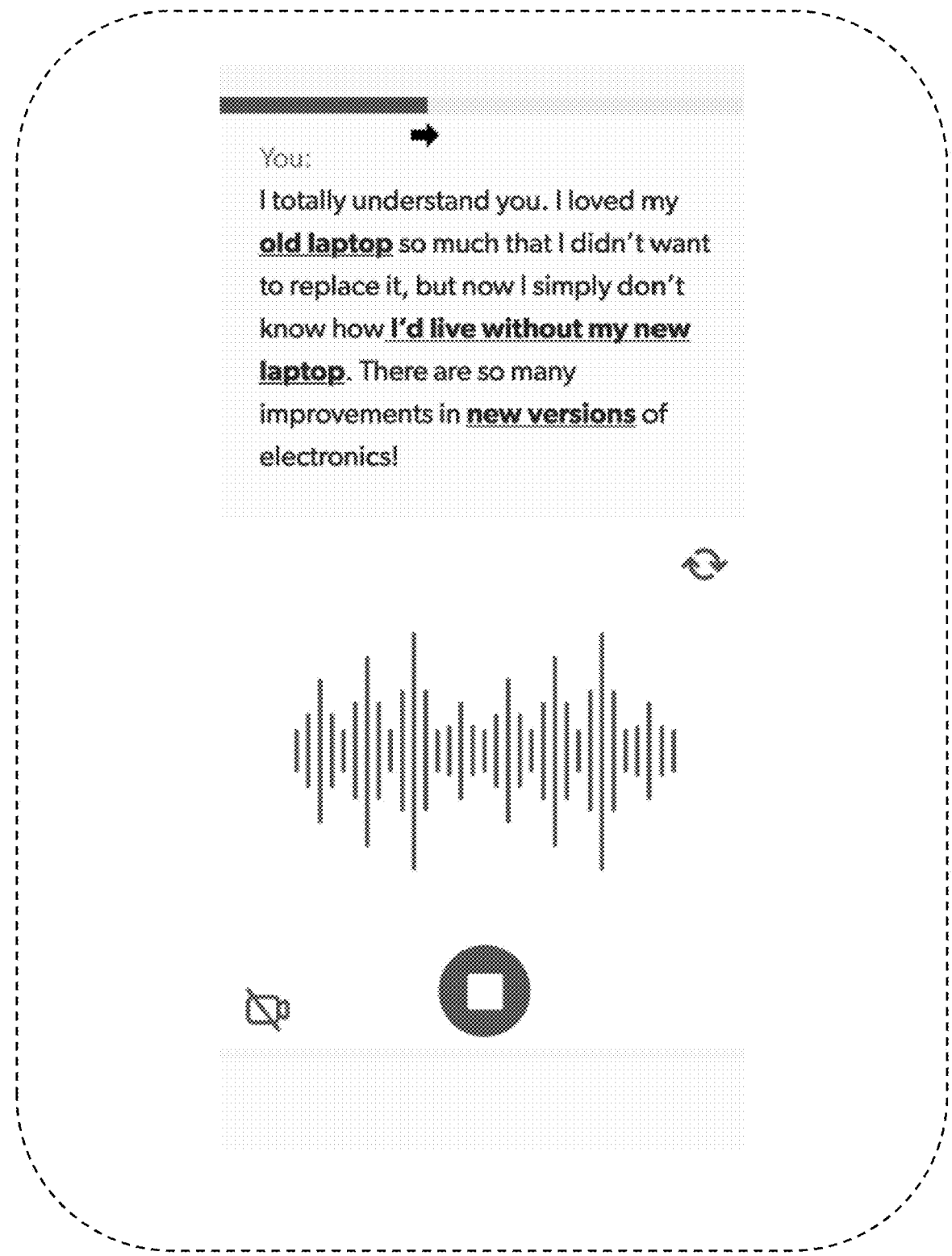
FIG. 10 is a depiction of the "Record" (trainee line spoken) screen.

FIG. 8 shows a "Starting in . . . " countdown screen that appears when the "Start" button in FIG. 7 is clicked. A count down number of 3 seconds (FIG. 8A) appears and counts down to 2 seconds (FIG. 8B), to 1 second (FIG. 8C), and then to zero seconds, at which time the Record screen of FIG. 9 appears. The text of the customer role appears and a progress bar that grows in the direction of the arrow as the customer role is heard. This allows the user-trainee to prepare for his or her forthcoming performance. Note the iconic square "Stop" button that allows the trainee to end the recording of a take. When the customer completes the first line of the customer role, the screen shown in FIG. 10 appears. The user script is displayed and a progress bar paces the user in speaking the role. If the customer role has additional line(s), a screen similar to FIG. 9 will then display with the next customer line. This is followed by a version of FIG. 10 with the next user line and so forth until both roles of the scenario have been completely performed.

Figure 11:
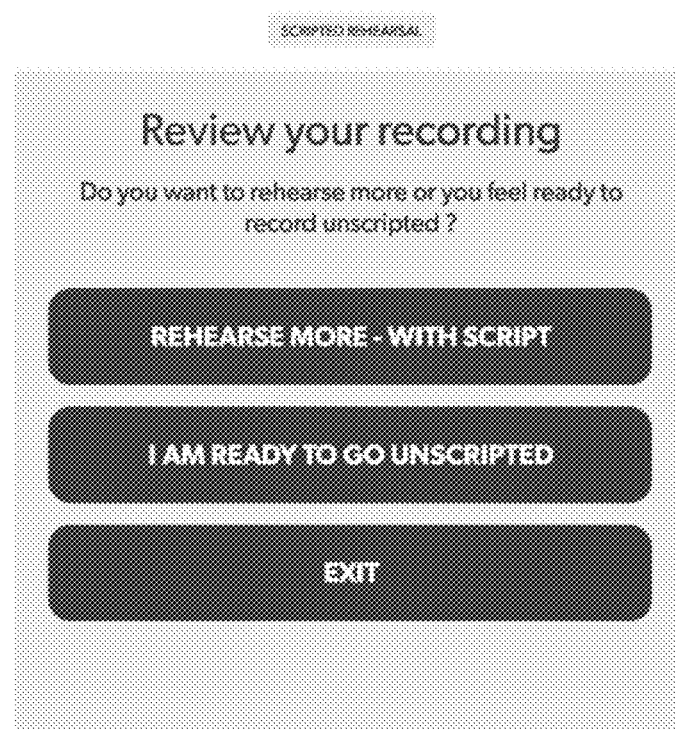
FIG. 11 is a depiction of the "Review performance" screen.

At that point, a "Review" screen (FIG. 11) appears. This allows the user to review the scenario by clicking on the "SCRIPTED REHEARSAL" button. This causes both the customer and just-performed trainee roles to be juxtaposed. In one embodiment, the system alternately plays the customer part(s) and the trainee part(s) sequentially to reproduce the entire scenario. This allows the trainee to view his or her performance within the context of the entire scenario and decide whether the recorded performance is of adequate quality. The particular embodiment illustrated is arranged to require the user to perform without a script as a final task. In this embodiment, this requirement is implemented by providing only three ways out of The Review screen: (1) Rehearse the performance again ("REHEARSE MORE") with a script (the system may automatically blank out parts of the script as mentioned above; (2) Perform without a script ("I AM READY TO GO UNSCRIPTED"; or (3) "EXIT" the entire process. If the trainee is not satisfied with his or her performance, the trainee selects "REHEARSE MORE" and executes one or more performances until satisfactory results are obtained. When the trainee is satisfied, he or she selects the "I AM READY" button to perform without a script. The trainee then performs without a script until the user is satisfied with the performance. In some embodiments, the system may automatically (e.g., via AI) evaluate and score the user-trainee's take according to any number of given criteria, and recommend (or mandate) that the user either "REHEARSE MORE" or "GO UNSCRIPTED."

Figure 12:
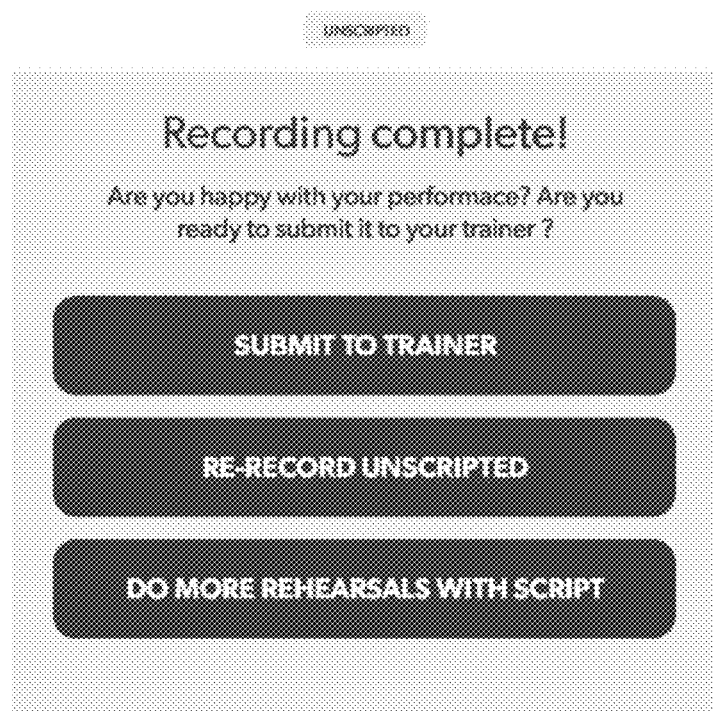
FIG. 12 is a depiction of the "Recording complete!" screen.
Figure 13:
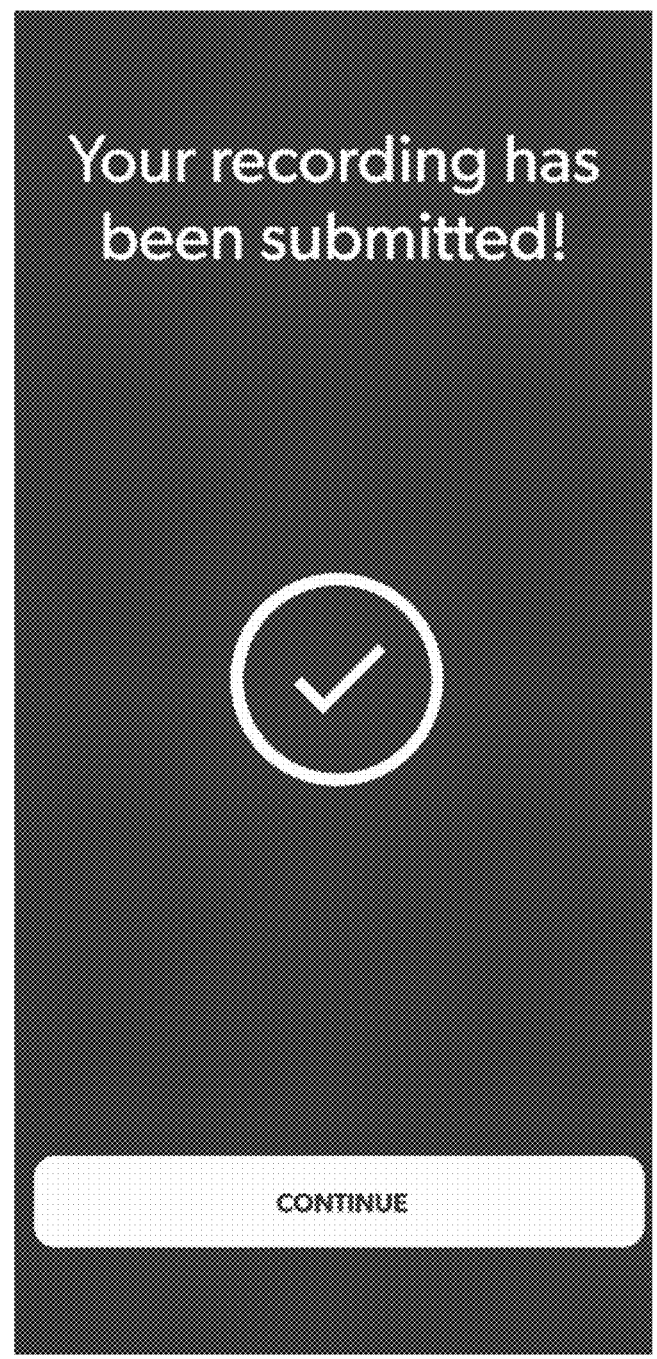
FIG. 13 is a depiction of the "Submission (Your recording has been submitted)" screen.

FIG. 12 shows the "Recording complete!" screen that appears at the end of an unscripted performance. The user can select "SUBMIT TO TRAINER" or "RE-RECORD UNSCRIPTED" or "DO MORE REHEARSALS WITH SCRIPT" (in case the user thinks it is necessary to learn from scripted performances). When "SUBMIT TO TRAINER" is selected, the recording is submitted (FIG. 13, "Recording has been submitted" screen), thus allowing the Trainer (and/or an AI system) to evaluate and grade the performance.

Figure 14:
FIG. 14 depicts a screen similar to that of FIG. 10, but where the trainee is making an audiovisual recording.
Figure 14:
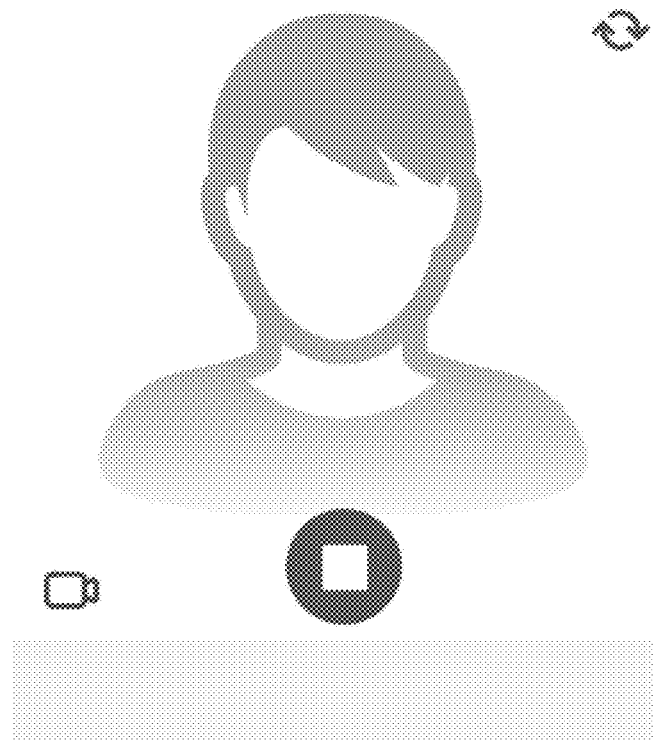
Figure 15:
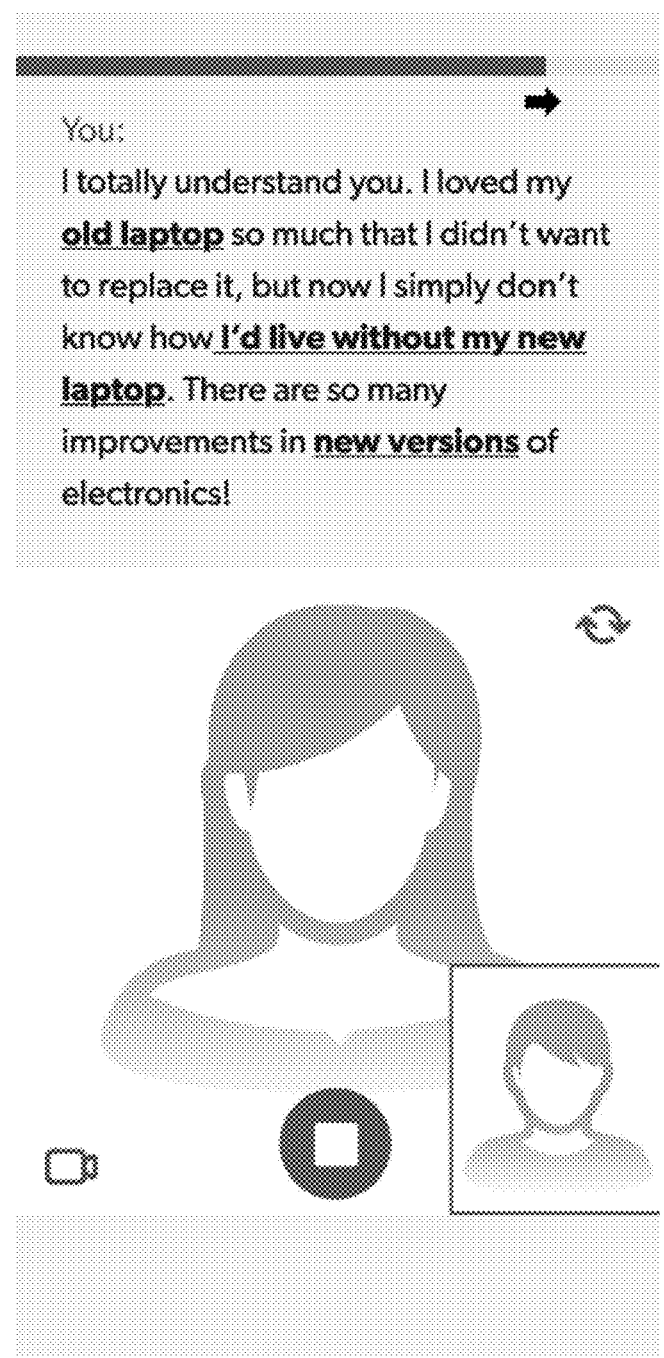
FIG. 15 depicts a screen similar to that of FIG. 10, but where the customer master is audiovisual and the trainee is making an audiovisual recording.

There are three modes of performances. In the first mode, the user performs against an audio master and an audio of the user is recorded for evaluation purposes. This is the mode described immediately above. In the second mode, shown in FIG. 14, the trainee performs against an audio master (as in the first mode), but the trainee's camera is active and an audiovisual recording of the trainee's performance is recorded. In the third mode, shown in FIG. 15, the trainee performs against an audiovisual master and the trainee's performance is captured as both audio and video. As shown in the drawing, the appropriate part of the audiovisual master (customer role) is displayed in the main window below the teleprompter script while the trainee's performance is displayed as a "picture-in-picture," here in the lower right. This allows the user to see the facial expressions of the audiovisual master as a performance aid.

Figure 16:
FIG. 16 is a depiction of the trainer "Feed" screen.
Figure 17:
FIG. 17 is a depiction of the trainer "Submissions" screen.
Figure 17:
Figure 17:
Figure 17:
Figure 17:
Figure 17:
Figure 17:
Figure 17:
Figure 17:
Figure 17:
Figure 18:
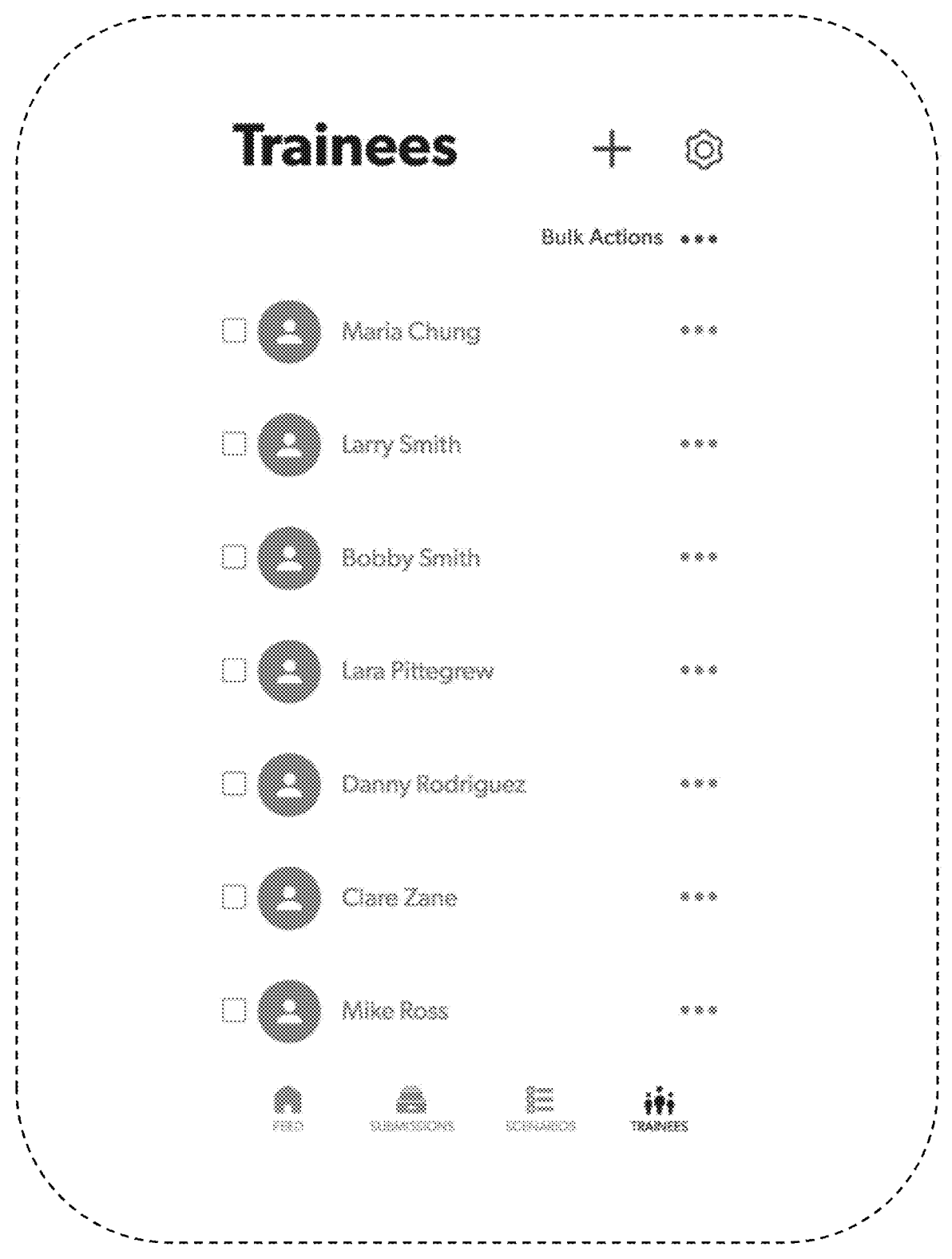
Figure 19:
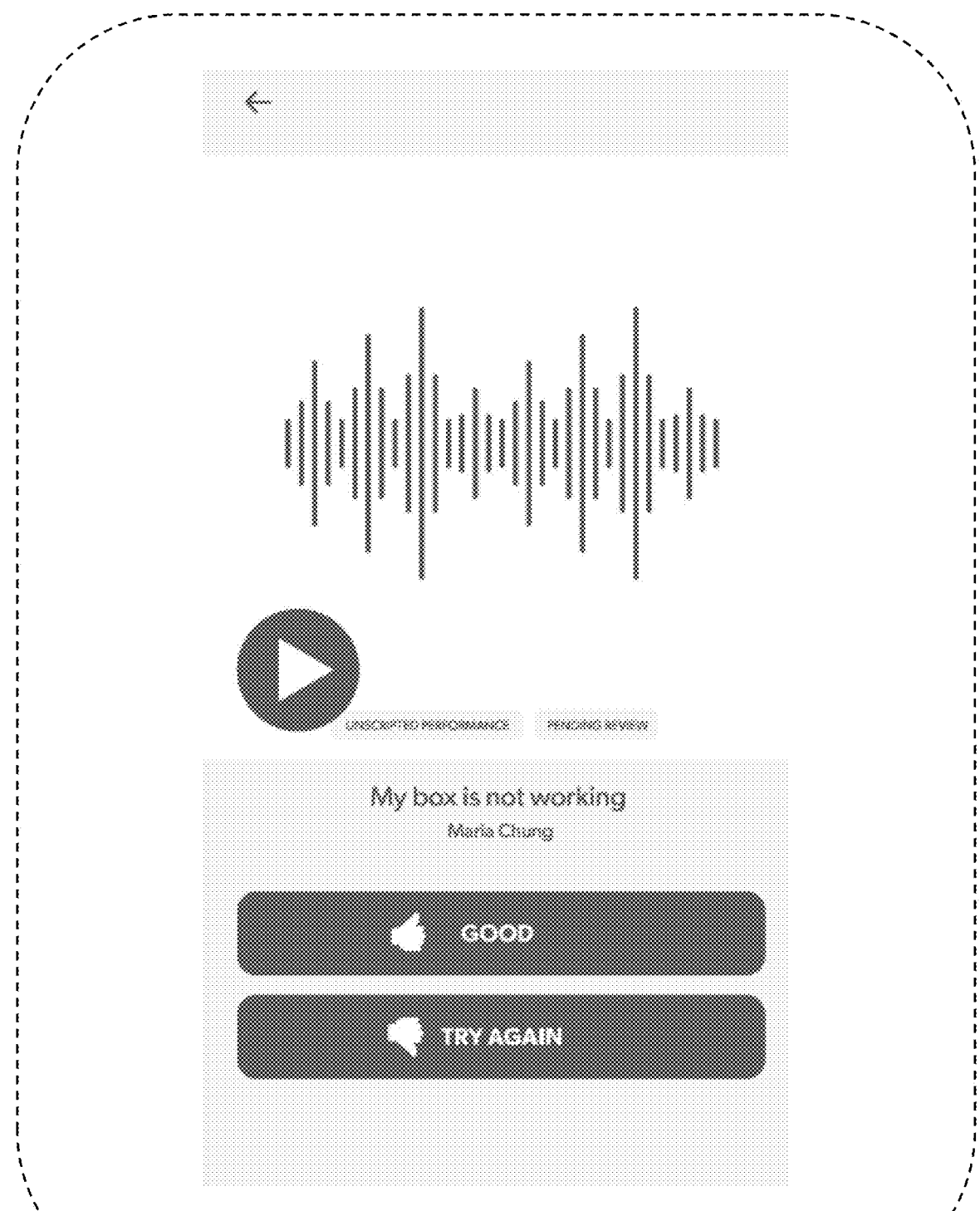
FIG. 19 is a depiction of the "Rating" screen used by the trainer to rate submissions from the trainees.
Figure 20:
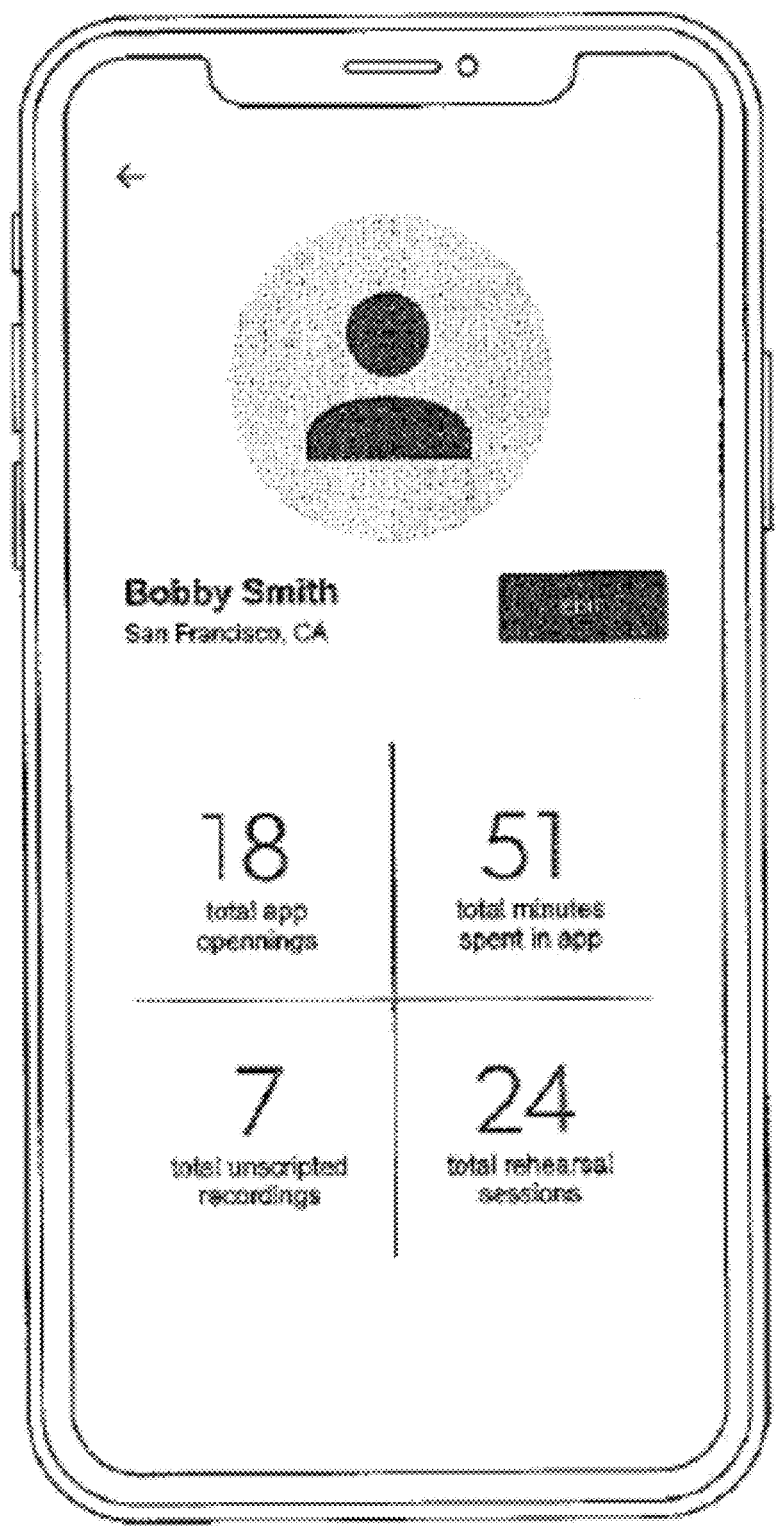
FIG. 20 shows a metric screen used by the trainer.

Many of the screens used by the Trainer are similar or identical to those seen by the Trainee. The trainer signs in and sees a Feed screen (FIG. 16) that is similar to that seen by the trainee, except that the trainer's Feed screen also shows recent system "news" and submissions from trainees and has a "Submission" button that leads to a Submissions screen (FIG. 17), which shows all the submitted performances and whether or not they have been reviewed. A "Trainee" button leads to a Trainee screen (FIG. 18), which shows all the trainees assigned to that trainer. FIG. 19 shows a "Rating" screen used by the trainer to view and rate ("Good" or "Try Again") a selected submission. FIG. 20 shows a metric screen (one is provided to track each trainee). The trainer uses this to assess the amount of training time used by the trainee.

System. A preferred embodiment of the inventive system is primarily accessed via smartphone. This embodiment involves a native application for the operating system of the particular phone, which is downloaded from either the "Apple App Store in iOS" or "Google Play store in Android." The application could also be built for "Amazon" devices or other application platforms. The downloaded application allows a user to practice the invention via a smartphone device; the application utilizes the native components of the device to instruct the camera, microphone, and speaker of the smartphone to function in sync with the various tasks being performed by the inventive system (e.g., the microphone records only when the user has a speaking part, etc.).

Figure 21:
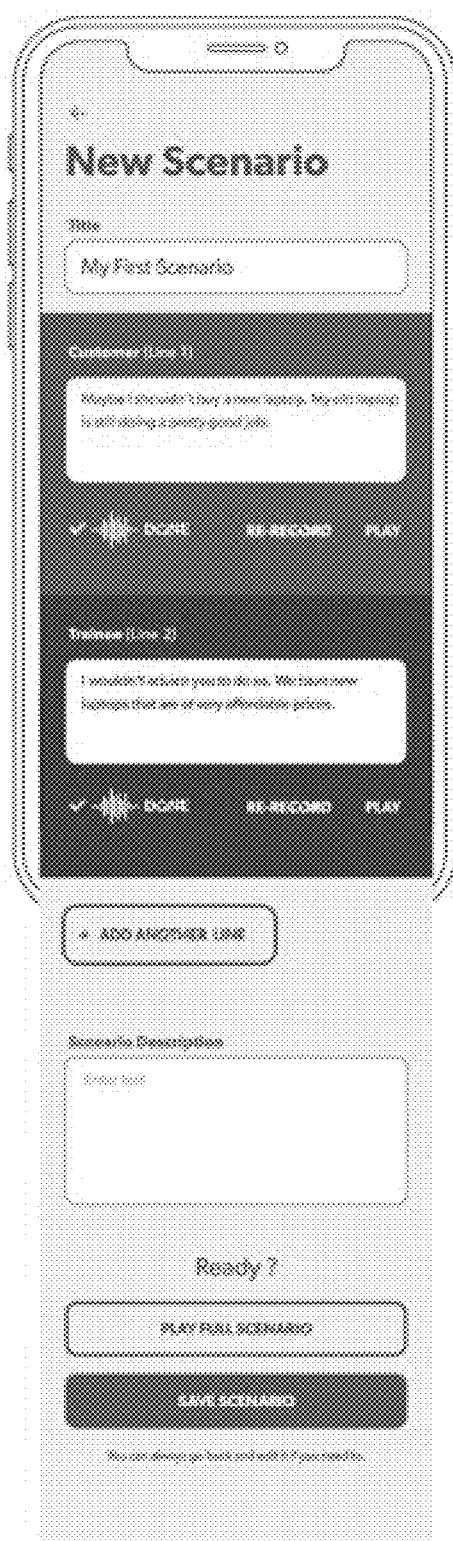
FIG. 21 shows the "New Scenario" screen used to create new scenarios.

The preferred implementation of the application is bifurcated to support two different types of users ("trainers" and "trainees"). The trainer is allowed to create scenarios on the app by entering text, using the native microphone to record the audio version of the entered text (or in some cases, utilize the smartphone's camera and microphone to record audiovisual performances of text lines). FIG. 21 shows a "New Scenario" screen used by the trainer to create a new scenario. This screen allows the trainer to enter a script one line at a time. The trainer creates both sides of the scenario, i.e., both the customer's lines and the customer service representative's (trainee's) lines. After the script for the new scenario has been entered and saved, the trainer records an audio (or audiovisual) master for each role to create the embedded timing information for the progress bar. The trainer is also able to "extract" a new script from e.g., (1) the spontaneous responses generated by a chatbot and/or AI; and/or (2) the trainee's responses thereto (i.e., with the aforesaid chatbot's and/or AI's speech).

An important task for the trainer is to review the assignments (recorded takes) turned in by the trainees. Such reviewing not only allows the trainer to analyze progress made by the trainees, but also gives the trainer ideas for improved training assignments. In many operations, a single trainer has to supervise a large number of trainees. To ensure that each trainee receives rapid responses to their submitted assignment, it is possible to employ an artificial intelligence (AI) system to review some or all of the assignments. The AI system starts by processing a large number of scenes (trainee plus customer) derived from the same script where these scenes have already been rated by a trainer (the trainer may rate these scenes according to numerous criteria, including fidelity to script and match as to a desired persona). The AI system learns which patterns generate good ratings and which generate poor ratings. After an initial training, the AI system begins to rate new scenes; as part of the learning process, the trainer also rates these scenes so that the AI system learns to tune its own ratings to more closely approximate ratings provided by human trainers. Once the AI system is fully trained, it can also be used to review ratings given by different trainers to ensure there is consistency from trainer to trainer.

The application is written in whatever programming language and development platform is required for the native smartphone (e.g., Objective-C or C++ languages and the Xcode platform for iOS). Completed recordings are uploaded to cloud servers (e.g., Amazon Web Services or "AWS") and then encoded and streamed back to the users via HTTP Live Streaming ("HLS") for "pairings" to be reviewed. When a trainee chooses a scenario to practice, the application uses an application programming interface ("API") to request a download of an audio or audiovisual recording. The download commences as the trainee enters the Teleprompter. As soon as the download is complete, the countdown begins and the application instructs the device to playback the recording. The application engages the trainee's microphone when it is the trainee's turn to speak, and then mutes the trainee's microphone while simultaneously engaging the smartphone speaker and/or visual display to reproduce the audio and/or video, respectively, of the recording when the opposing part is meant to be heard and/or seen, respectively.

When "video" is chosen (i.e., when the user wants to create an audiovisual recording), the camera on the smartphone is engaged to record the subject on video throughout the scene. An API (e.g., Node.js) is used to communicate with the backend of the application's database. The database (e.g., on the MongoDB program) stores all of the information collected from various users' activities on the application. The system also relies upon a data aggregation service (e.g., one provided by Mixpanel) to capture programmed event details on all trainees, so that trainee activity can be monitored by trainers (e.g., as to the time a particular trainee spends on the app, the number of times a particular trainee attempts to practice, the total number of scenarios attempted by a particular trainee, etc.). One of ordinary skill in the art will recognize that the precise implementation of the invention can readily depart from this presently preferred embodiment. Moreover, as discussed above, this same system can also be supported via internet supported web browsers (e.g., in HTML).

The following claims are thus to be understood to include what is specifically illustrated and described above, what is conceptually equivalent, what can be obviously substituted, and also what incorporates the essential idea of the invention. Those skilled in the art will appreciate that various adaptations and modifications of the just-described preferred embodiment can be configured without departing from the scope of the invention. The illustrated embodiment has been set forth only for the purposes of example and should not be taken as limiting the invention. Therefore, it is to be understood that, within the scope of the appended claims, the invention may be practiced other than as specifically described herein.

What is claimed is:

1. A method for training a trainee employing juxtaposable and interchangeable takes, the method comprising the steps of:
    selecting a training scenario from an internet-connected server, wherein a script is associated with the scenario, wherein the script includes a first role and a second role, wherein the first role is assigned to the trainee; wherein the first role includes a plurality of lines to be spoken by the trainee; wherein at least one pre-recorded audio or audiovisual take of the second role is associated with the script and wherein the trainee records a plurality of takes of the first role using an internet connected computing device, such that:
        all takes of the first role of the script are interchangeable, and
        the at least one take of the second role of the script is juxtaposable with all takes of the first role of the script;
    selecting a particular one of the recorded plurality of takes of the first role to be played in juxtaposition with the at least one take of the second role;
    playing the selected one of the recorded plurality of takes of the first role in juxtaposition with the at least one take of the second role; and
    evaluating a level of the trainee's training based on the playing of the first and second roles in juxtaposition.

2. The method of claim 1, wherein each recording of the plurality of takes of the first role is recorded while displaying, in synchrony with the performance, each performed line from the script along with the duration of each line.

3. The method of claim 1, wherein at least one duration of a line of the first role is automatically detected.

4. The method of claim 1, wherein a portion of at least one line of the first role from the script is blanked out.

5. The method of claim 4, wherein a progressively larger portion of at least one line of the first role is blanked out for each successive take of the first role.

6. The method of claim 1, wherein the script is a written script wherein at least a portion is prepared by a human trainer.

7. The method of claim 1, wherein the script is a written script wherein at least a portion is prepared by voice to text translation.

8. The method of claim 1, wherein one of the takes associated with the script contains audio created by text to voice translation of the script.

9. The method of claim 1, wherein the trainee is an artificial intelligence system.

10. The method of claim 1, wherein the step of evaluating is carried out by a human trainer.

11. The method of claim 1, wherein the step of evaluating is carried out by an artificial intelligence system.

12. The method of claim 1, wherein the training scenario portrays interactions between a customer and a customer service representative to train the trainee as a customer service representative.

13. The method of claim 1, wherein the training scenario portrays conversations between individuals in a foreign language to train the trainee in the foreign language.

* * * * *